United States Patent [19]
Tanaka

[11] 3,820,131
[45] June 25, 1974

[54] ELECTRONIC SHUTTER FOR CAMERA
[75] Inventor: Harumi Tanaka, Kobe, Japan
[73] Assignee: Minolta Camera Kabushiki Kaisha, Osaka, Japan
[22] Filed: June 29, 1973
[21] Appl. No.: 374,836

[30] Foreign Application Priority Data
July 10, 1972 Japan.......................... 47-69281
July 18, 1972 Japan.......................... 47-72186
July 18, 1972 Japan.......................... 47-72187

[52] U.S. Cl..................... 354/38, 354/50, 354/247, 354/258, 354/271
[51] Int. Cl........ G03b 7/08, G03b 9/14, G03b 9/62
[58] Field of Search......... 95/10 CT, 10 CE, 10 CD, 95/53 EA, 53 EB, 64 R

[56] References Cited
UNITED STATES PATENTS
| | | | |
|---|---|---|---|
| 3,362,309 | 1/1968 | Cooper, Jr. et al................ | 95/10 CT |
| 3,416,421 | 12/1968 | Biedermann et al. ............ | 95/10 CT |
| 3,554,104 | 1/1971 | Winkler........................... | 95/10 CE |

Primary Examiner—Joseph F. Peters, Jr.
Attorney, Agent, or Firm—Wolder & Gross

[57] ABSTRACT

An electronic shutter includes an electromagnet under the control of an exposure time control electric circuit to control the forward movement of a shutter drive member and to thereby control the exposure time, and operation delaying means for eliminating the influence of the delayed actions of the electromagnet and of an attraction member during the period after the drive member has been initiated into operation until the shutter starts to open so as to stabilize the operation of the shutter at a high speed. The shutter further includes a diaphragm mechanism for determining the diaphragm aperture size in accordance with the brightness of the subject to enable the shutter to operate as a program shutter of the constant shutter speed type for subjects whose brightness is higher than a specified value and as a program shutter of the shutter speed control type with the diaphragm aperture fully opened for subjects having a lower brightness.

16 Claims, 12 Drawing Figures

ELECTRONIC SHUTTER FOR CAMERA

BACKGROUND OF THE INVENTION

The present invention relates to electronic shutters for cameras, more particularly to an electronic shutter wherein the exposure time is controlled by an electromagnet to be energized for a variable period of time in accordance with the brightness of the subject.

Electronic shutters heretofore known are so complex in construction that they are not suitable for ultraminiature cameras employing 16 mm (⅝ inch) film or for inexpensive simplified cameras from the viewpoint of an increased space required, cost and the like, whereas electronic shutters of the simplified type involve difficulties in giving high shutter speeds and are not adapted for photographing very bright subjects therefore.

In a shutter which includes shutter blades slidable reciprocally over a given distance such that the shutter is fully opened for a moment and then closed, it is known to use an electronic shutter incorporating an electromagnet for controlling the exposure time. However, since the distance of reciprocal travel of the shutter blades is constant, it becomes impossible to obtain a high shutter speed due to a delay in shutter closing action, if the operation of the shutter drive member or the like is affected by the delayed action of the electromagnet or by the inertia of an attraction member to be operated upon energization and deenergization of the electromagnet.

In a construction in which the above-mentioned attraction member is adapted to be pressed against the attracting face of unenergized electromagnet by cocking or tripping the shutter, a great pressure, if exerted on the attraction member for example by overcocking, would produce a detrimental effect on the electromagnet and attraction member or on the strength of the support means therefor.

Also known heretofore as electronic shutters of the program type are a shutter that is opened, at a constant diaphragm aperture value, for a period of time controlled in accordance with the brightness of the subject and another shutter which is opened progressively at a constant rate and is thereafter closed upon lapse of a time determined by the time constant of a light measuring integration circuit in accordance with the brightness of the subject.

The former of the program shutters is so designed that even when a very bright subject is photographed, the shutter is opened to a full extent at a definite diaphragm aperture value and is thereafter closed. Consequently, there is a limitation on the minimum time required for the shutter opening and closing action, this resulting in the serious drawback that proper exposure control can not be achieved when photographing a brighter subject.

On the other hand, the latter of the electronic program shutter requires too long an exposure time when photographing a dark subject, this failing to assure a quick photographing operation and making it very difficult to prevent frequent occurrence of objection such as camera shake.

Furthermore, if it is attempted to incorporate the function of electronic shutter of the program type into the aforementioned shutter including the reciprocally slidable shutter blades, the construction becomes inevitably complex and necessitates a greater space. Thus various problems have conventionally been encountered in incorporating such electronic shutter into the ultraminiature camera.

SUMMARY OF THE INVENTION

An object of this invention is to provide an electronic shutter including shutter blades reciprocally slidable over a constant distance which is free of any fluctuations in the minimum time required for a shutter opening and closing action to give high shutter speeds wilh ease and stability.

Another object of this invention is to provide an electronic shutter of the type described wherein an attraction member is adapted to be pressed against the attracting face of an electromagnet by a shutter tripping or cocking operation and in which the electromagnet, attraction member or supporting means therefor will not be adversely affected for example by overcocking.

Another object of this invention is to incorporate an additional simple construction into the electronic shutter of the type described so as to permit the shutter to make a bulb exposure, namely a long-time exposure.

Another object of this invention is to provide an electronic shutter of the program type comprising the combination of the foregoing electronic shutter and diaphragm means of a simple construction having a diaphragm aperture size changeable in accordance with the brightness of the subject.

Another object of this invention is to provide an electronic shutter of the program type including the above-mentioned diaphragm means adapted to be braked by an electromagnet whose magnetism is variable in accordance with the brightness of the subject.

Still another object of this invention is to provide an electronic shutter of the program type comprising the combination of the foregoing electronic shutter and diaphragm means having a diaphragm aperture size to be controlled by the balance between a fixed resistor and a photocell whose resistivity is variable in accordance with the brightness of the subject.

When taking a photograph at a medium or low shutter speed with the shutter of this invention, an attraction member held attracted to an electromagnet latches a shutter drive member for a period of time suitable to give the desired amount of exposure to the film while the shutter is kept open to a full extent. A shutter opening and closing member is reciprocally pivotally moved by the specified turning movement of the shutter drive member to slidingly move shutter blades back and forth and to thereby open and close the shutter. According to the present invention, there is provided delaying means for delaying the operation of the shutter drive member after the drive member has been initiated into movement until the acutating arm of the drive member engages a shutter opening pin on the shutter opening and closing member to initiate a shutter opening action, namely during the period from the start of a shutter tripping action until the initiation of the shutter opening action.

More specifically, the delaying means comprises a governor adapted for engagement with the drive member to brake its turning movement during the desired period after the drive member has been initiated into movement until the shutter starts to open, or operation delaying means involving the provision of the longest possible distance between the actuating arm and the shutter opening pin as the shutter is in its cocked position, or the combination of the former and the latter. The intended object can be fulfilled by delaying the operation of the shutter drive member with the means described above before the actuating arm comes into engagement with the shutter opening pin.

When it is desired to operate the shutter at a high speed, the attraction member has already been retracted from the drive member latching position by a spring force acting thereon by the time the drive member reaches the latching position where the shutter is fully opened, with the result that the shutter drive member engages the shutter opening and closing member free of any trouble to open and close the shutter at a high speed. Thus the delay in the action of the electromagnet and the inertia of the attraction member are overcome by the operation delaying effect achieved upon the initiation of movement of the shutter drive member, eliminating any fluctuation in the minimum time required for the completion of the shutter opening and closing operation to thereby assure improved performance of the shutter at high speeds.

The attraction member is pressed against the attracting face of the electromagnet by its driven arm being pushed by a member operated by a shutter tripping or cocking action. The driven arm has a suitable elasticity for elastic deformation, so that when acted on with an excess force as by overcocking, the arm absorbs the force through the elastic deformation. In this way the electromagnet, attraction member or the mounting means therefor are protected from excess pressure acting thereon.

The attraction member has a projecting driven piece to be depressed by a shutter button which is selectively shiftable when making a bulb exposure. It is so associated that while the shutter button is in its depressed position for a bulb exposure, it will be held pressed against the attracting face of the electromagnet to latch the shutter drive member in the course of movement and to thereby maintain the shutter in its full-open state. In this state the electric circuit of the shutter must of course be out of operation and, for this purpose, the shutter button has been shifted as described above so as to leave the main switch of the circuit open despite the depression of the shutter button.

The electronic shutter of the program type according to this invention includes, in addition to the reciprocally slidable shutter blades, diaphragm blades which are likewise slidable reciprocally. During forward travel of the disphragm blades, the diaphragm aperture progressively enlarges and opens up to a maximum size at the extremity of the forward travel. Upon completion of an exposure or by a shutter cocking operation, the diaphragm aperture is totally closed or reduced to a minimum size. The aperture size is variable in corresponding relation to the brightness of the subject to be photographed.

To give a proper amount of exposure to the film, the diaphragm aperture is controlled by an electromagnet whose magnetism is variable in accordance with the brightness of the subject and a member associated therewith or by an electromagnet for holding the diaphragm blades attracted directly thereto in accordance with the brightness of the subject.

More specific constructions of the foregoing mechanisms and other objects and features of this invention will become more apparent from the following description of several embodiments of the invention.

DESCRIPTION OF THE PREFERRED EMODIMENTS

Figure 1:
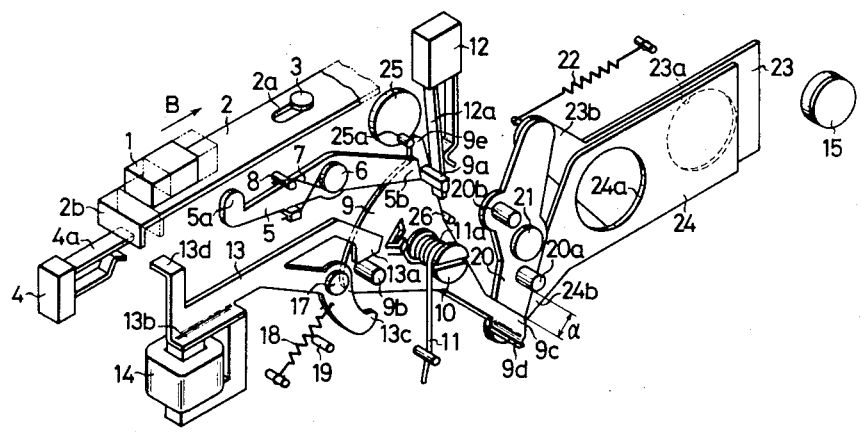
FIG. 1 is a perspective view showing the principal part of an embodiment of this invention.

With reference to an embodiment shown in FIG. 1, a shutter button 1 is fixedly placed on one end of an elastic seat plate 2 slidably mounted on an unillustrated camera body by a pin 3 inserted in a slot 2a at the base end of the seat place 2. The shutter button 1 is projected outward from the camera body in depressible manner with the elastic restoring force of the seat plate 2.

Figure 2:
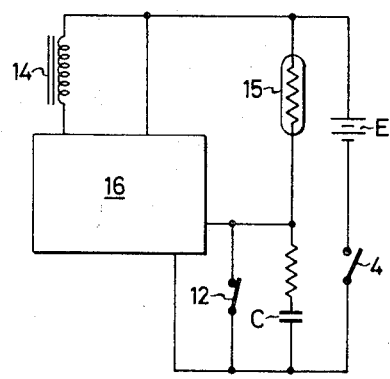
FIG. 2 is a diagram showing an exposure time control electric circuit for the embodiment of FIG. 1.

Under the bent end 2b of the elastic seat plate 2, there is a movable contact member 4a of main switch 4 of an exposure control electric circuit shown in FIG. 2. When depressed, the shutter button 1 closes the main switch 4.

Also disposed under the elastic seat plate 2 is the driven portion 5a of a shutter latch lever 5 which is pivoted to a pin 6 on the camera body and biased by a spring 7 in a clockwise direction. A stopper 8 determines the position of the lever 5. When the shutter is in its cocked position, the tail end 5b of the lever 5 latches a pin 9a on a shutter drive member 9 to retain the member 9 in its cocked position. Depression of the shutter button 1 rotates the lever 5 in a counterclockwise direction to free the drive member 9 from its latched position.

The shutter drive member 9 is pivoted to a pin 10 on the camera body and is movable in the axial direction of the pin. The drive member is biased by a spring 11 in a counterclockwise direction and pressed toward a base plate (not shown) supporting the pin 10 by the axial elastic force of coiled portion 11a of the spring 11. The pin 9a on the member 9 is in engagement with the tail end 5b of the shutter latch lever 5 when the shutter is in its cocked state as already described and keeps a count switch 12 of the electric circuit closed by pushing its movable contact member 12a. Further in the cocked state, another pin 9b on the member 9 pushes up the driven arm 13a of an attraction member 13 to press its attraction piece 13b against the attracting face of an electromagnet 14.

When the main switch 4 is closed, the electromagnet 14 is immediately energized with current from a power source E to attract the attraction member 13 and hold the same at the attracted position. The time or duration of energization is controlled by the time of time constant of a light measuring integration circuit comprising a capacitor C and a photocell 15 which starts to function upon opening of the count switch 12. When the charged voltage of the capacitor C reaches a predetermined value, a switching circuit 16 operates to interrupt the supply of the energizing current and eliminate the attraction.

The attraction member 13 is pivoted by a pin 17 to the camera body and urged by a spring 18 in a clockwise direction. The member 13 has a latch arm 13c which is positioned, while the attraction piece 13b is held attracted to the electromagnet 14 with its magnetic force or is pressed against the magnet, in the path of movement of the pin 9b on the member 9 to latch the pin 9b in the course of counterclockwise movement of the member 9 and to thereby temporarily stop the member 9, whereby the shutter is held fully open as will be described later.

When the attraction piece 13b is released from the electromagnet 14, the member 13 rotates in a clockwise direction under the action of the spring 18 and stops upon contact with a stopper 19. In this way, the arm 13c retracts from the path of the pin 9b, rendering the shutter drive member 9 movable in a counterclockwise direction.

The shutter drive member 9 further has an actuating arm 9c. Positioned in the path of movement of the actuating arm 9c during the counterclockwise rotation of the member 9 are a shutter opening pin 20a and a shutter closing pin 20b on a shutter opening and closing member 20 for engagement with the arm 9c. The movement of the shutter opening pin 20a out of the path of the actuating arm 9c causes the opening and closing member 20 to move in a counterclockwise direction, and subsequently the actuating arm 9c pushes the shutter closing pin 20b to pivotally move the opening and closing member 20 in a clockwise direction.

The shutter opening and closing member 20 is supported by a pin 21 on the camera body and is urged by a spring 22 in a clockwise direction. The member 20 is connected, at its one end, to the arm 23b of a shutter blade 23 having a shutter opening 23a and, at the other end thereof, to the arm 24b of a shutter blade 24 having a shutter opening 24a in such manner that the reciprocal pivotal movement of the member 20 causes the shutter blades 23 and 24 to slidingly move back and forth in opposite directions.

FIG. 1 shows the shutter in its completely cocked state wherein the main switch 4 is open and the count switch 12 is closed. Depression of the shutter button 1 in this state closes the main switch 4 to apply current to the electromagnet 14, whereupon the magnet 14 is energized to hold the attraction member 13 attracted at the illustrated position. At the same time, the shutter latch lever 5 rotates in a counterclockwise direction and unlatches the shutter drive member 9, which in turn moves in a counterclockwise direction under the action of the spring 11 to open the count switch 12. The actuating arm 9c engages with the shutter opening pin 20b to move the pin 20a away from the path of movement of the arm 9c, whereby the shutter opening and closing member 20 is driven in a counterclockwise direction. Consequently, the shutter blades 23 and 24 slide along in directions opposite to each other to overlap the openings 23a and 24a to an increasing extent and to progressively open the shutter.

In the path of advance of the pin 9b on the shutter drive member 9, there is located the latch arm 13c of the attraction member 13 which remains attracted to the magnet 14 while the magnet 14 is energized, so that unless the magnet 14 is deenergized before the pin 9b reaches the position of the latch arm 13c, in other words, within the range of medium and low shutter speeds, the pin 9b comes into engagement with the latch arm 13c, this temporarily interrupting the counterclockwise rotation of the shutter drive member 9. Just in this state, the actuating arm 9c of the drive member 9 drives the shutter opening pin 20a away from the path of movement thereof, permitting the pin 20a to position at the distal end of the arm 9c, the construction being such that the shutter will be full open when the respective members are thus located.

If the count switch 12 is opened at the start of movement of the shutter drive member 9, the photocell 15 begins to charge the capacitor C in the electric circuit of FIG. 2. Thus the light measuring integration circuit comprising the photocell 15 and capacitor C starts its operation. Subsequently, upon lapse of the time determined by the time constant of the integration circuit, namely when the charged voltage in the capacitor C reaches the specified value, the switching circuit 16 functions to deenergize the electromagnet 14, whereupon the attraction member 13 rotates in a clockwise direction under the action of the spring 18, permitting the latch arm 13c to retract from the path of advance of the pin 9b.

When a bright subject is to be photographed with the apparatus described, namely if a high shutter speed is required, the photocell will be low in its resistivity to shorten the time of time constant, hence shorter duration of energization of the electromagnet. Thus if the electromagnet 14 is deenergized before the pin 9b on the shutter drive member 9 comes into engagement with the latch arm 13c, the shutter drive member 9 will continue to move to its final position without being stopped in the course of counterclockwise movement. If the subject is lower in its brightness, the electromagnet 14 remains energized at the time the pin 9b is latched by the arm 13c, with the result that while the magnet 14 is in its energized state, the shutter drive member 9 will be temporarily prevented from counterclockwise rotation to retain the shutter in its fully opened position. Upon the subsequent deenergization of the magnet 14, the member 9 starts its counterclockwise movement again.

The counterclockwise motion of the shutter drive member 9 fully opens the shutter and further motion of the same in a counterclockwise direction initiates the shutter opening and closing member 20 into a backward clockwise movement under the action of the spring 22, causing the shutter blades 23 and 24 to slide along in the directions to reduce the shutter opening. In addition, the pushing contact of the actuating arm 9c with the shutter closing pin 20b accelerates the clockwise motion of the shutter opening and closing member 20 for a quick shutter closing action, preventing the shutter opening and closing member 20 from bouncing and making a re-exposure upon completion of closing of the shutter.

Thus the time taken for the shutter to fully open and the time required for complete closure from the full-open state are determined by the rapid counterclockwise motion of the shutter drive member 9. Except for the time during which the pin 9b is latched by the arm 13c, this counterclockwise motion is effected instantaneously, causing the shutter blades 23 and 24 to move rapidly forward or backward. In the case where the subject has a low brightness, the light measuring integration circuit functions to give an exposure time in corresponding relation thereto.

However, in the case where the subject has a brightness requiring a high shutter speed, the electromagnet 14 will be energized upon clsoing of the main switch 4 to attract the member 13 for a time even if it may be instantaneous. To achieve the highest shutter speed, the engagement of the pin 9b with the latch arm 13c must at least be avoided.

In this respect, when the electromagnet 14 is instantaneously deenergized and the attraction member 13 is forced toward a clockwise direction by the spring 18, the above-mentioned engagement may become unavoidable due to a delay in the action of the electromagnet 14 and the influence of inertia of the attraction member 13. Thus in taking a photograph at the highest shutter speed, the engagement, even if for a moment, produces an unnegligible effect on the exposure inasmuch as the shutter is fully open at the moment of the engagement.

Accordingly, there is provided a delaying means comprising a governor 25 including a pin 25a with which a projection 9e on the shtter drive member 9 engages when the shutter is in its cocked position, so that the counterclockwise turning of the member 9 will be thereby braked within a suitable period of time after the initiation of counterclockwise movement of the member 9 at least immediately before the actuating arm 9c comes into engagement with the shutter opening pin 20a. Alternatively, the delaying means may be provided by giving a distance $\alpha$ between the actuating arm 9c and the shutter opening pin 20a when the shutter is in its cocked position so as to produce an operation delaying effect during the period after the initiation of movement of the shutter drive member 9 until the actuating arm 9c comes into contact with the shutter opening pin 20a. The delaying means may further comprise the combination of the governor 25 and the distance $\alpha$.

The delaying means functions before the actuating arm 9c comes into engagement with the shutter opening pin 20a to delay the counterclockwise turning of the shutter drive member 9 to eliminate the adverse effect of delay in the action of the magnet 14 and the inertia of the attraction member 13 when a photograph must be taken at a high shutter speed. The delayed action and the inertia are therefore completely overcome by the time the pin 9b reaches the position of the latch arm 13c. The operation delaying effect, achieved entirely independently of the operation of the shutter blades 23 and 24, completely eliminates fluctuations in the highest shutter speed which would otherwise result from the contact of the pin 9b with the latch arm 13c to give a high shutter speed with a very stable operation.

The shutter will be cocked by returning the shutter drive member 9 in a clockwise direction in operative relation to an unillustrated shutter cocking mechanism. When a shutter opening and closing operation has been completed, the actuating arm 9c of the shutter drive member 9 is in pressing contact with the shutter closing pin 20b and is located between the pin 20b and the shutter opening pin 20a. Accordingly, if the shutter drive member 9 is moved in a clockwise direction, the rear side of the actuating arm 9c will contact the shutter opening pin 20a, this preventing further clockwise movement. Possibly, the arm might push the shutter opening pin 20a to force it out from the path of its movement, urging the shutter opening and closing member 20 in a counterclockwise direction, with the resulting objection that the shutter would be opened during the shutter cocking operation to expose the film again in the course of transport of the film.

In the illustrated embodiment, the actuating arm 9c is formed along its rear side with a curved edge 9d and the shutter drive member 9 is rendered movable on the pin 10 axially thereof, with the coiled portion 11a of the spring 11 biasing the member 9 in one direction. During the clockwise turning of the drive member 9, therefore, the drive member 9 is forced in the axial direction against the action of the coild portion 11a of the spring 11, permitting the curved edge 9d to be pushed up onto the tip of the shutter opening pin 20a. As a result, the arm 9c passes over the pin 20a without driving the shutter opening and closing member 20 and, accordingly, without making an exposure again.

Alternatively, the shutter drive member 9 may not be slidable on the pin 10 in its axial direction but the actuating arm 9c may be elastically flexible in the direction of its thickness so that the curved edge 9d will enable the arm 9c to move over the pin 20a.

The attraction member 13 is in contact with the stopper 19 with its driven arm 13a positioned in the path of clockwise movement of the pin 9b on the shutter drive member 9. Further clockwise turning of the shutter drive member 9 therefore brings the pin 9b into contact with the driven arm 13a and thereby drives the member 13 in a counterclockwise direction. Immediately before the clockwise turning of the shutter drive member 9 is completed, the member 9 presses the attraction piece 13b against the electromagnet 14. Similarly, just before the completion of the clockwise turning of the drive member 9, the pin 9a pushes the movable contact member 12a of the count switch 12 and closes the switch 12, and the projection 9e comes into engagement with the pin 25a of the governor 25.

To cause the tail end 5b of the shutter latch lever 5 to latch the pin 9a of the shutter drive member 9 and to thereby hold the member 9 in its cocked position, there is a need to turn the member 9 to an overcocked position determined by a stopper 26.

When the shutter is in its cocked position, the attraction piece 13b of the attraction member 13 is preferably in intimate contact with the attracting face of the electromagnet 14, because otherwise the action of the energized electromagnet 14 to attract and hold the attraction member 13 would involve a time loss such as a delay in the electromagnetic operation and the time required for the attracting face to attract the piece 13b.

Moreover, it would be necessary to increase the magnetism of the magnet 14, which entails a power loss.

If the shutter drive member 9 is driven to its overcocked position while the attraction piece 13b is brought into intimate contact with the attracting face of the electromagnet 14 at the completely cocked position as described above, the movement of the drive member 9 to the overcocked position would then cause the pin 9b to press the driven arm 13a with an increased pressure, consequently pressing the attraction piece 13b against the magnet 14 with a greater force.

To obviate such objection, elasticity is given to the driven arm 13a to enable the arm to flex to such an extent as will not be detrimental to the counterclockwise turning of the attraction member 13 against the action of the spring 18. Thus the elastic deformation of the driven arm 13a absorbs the pushing force of the pin 9b so as to prevent the force effecting the intimate contact between the attraction piece 13b and the electromagnet from producing an adverse effect on the respective members and support means therefor.

When the shutter drive member 9 reaches the overcocked position, the shutter latch lever 5 whose tail end 5b has been in contact with the upper face of the pin 9a rotates in a clockwise direction under the action of the spring 7, bringing the tail end 5b into the path of the counterclockwise movement of the pin 9a. When relieved of the operating force for shutter cocking upon the shutter being completely cocked, the shutter drive member 9 returns slightly in a counterclockwise direction, permitting the tail end 5b of the latch lever to latch the pin 9a and to thereby retain the member 9 in its cocked position. In spite of the shifting of the shutter drive member 9 from the overcocked position to the cocked position, the attraction piece 13b remains in intimate contact with the attracting face of the electromagnet 14, while the count switch 12 is held closed.

To make a bulb exposure, the elastic seat plate 2 is slidingly moved to the phantom line position along with the shutter button 1 as indicated by the arrow B in FIG. 1. This shifts the bent end 2b of the elastic seat plate 2 from the position on the movable contact member 4a of the main switch 4 to a position on the bent driven portion 13d of the attraction member 13 adjacent the contact member 4a.

Since the depression of the shutter button 1 does not close the main switch 4, the electromagnet 14 will not be energized, but the bent end 2b pushes the bent driven portion 13d and brings the attraction piece 13b into pressing contact with the attracting face of the electromagnet 14. Thus while the shutter button 1 is held depressed, the same state is maintained as when the energized electromagnet 14 keeps the attraction member 13 in its attracted position. The shutter drive member 9, now released from the shutter latch lever 5 by the depression of the shutter button, turns under the action of the spring 11 in a counterclockwise direction to open the shutter to a full extent, whereupon it is prevented by the latch arm 13c of the attraction member 13 from further counterclockwise movement to maintain the shutter in its full-open position.

The shutter button 1 is freed from the depression upon completion of the required exposure, whereupon the button returns upward along with the elastic seat plate 2, relieving the attraction member 13 of the pressure. This allows the spring 18 to pivotally move the member 13 in a clockwise direction until it contacts the stopper 19, freeing the shutter drive member 9 from engagement with the latch arm 13c and bringing the same into rapid counterclockwise movement to operate the shutter opening and closing member 20 and close the shutter from the full-open state.

In the construction described, the shutter button 1 and the elastic seat plate 2 need not necessarily be movable together, but the seat plate 2 alone, with the shutter button 1 supported thereon, may be rendered slidable by being guided by the engagement of its slot 2a with the pin 3.

Figure 3:
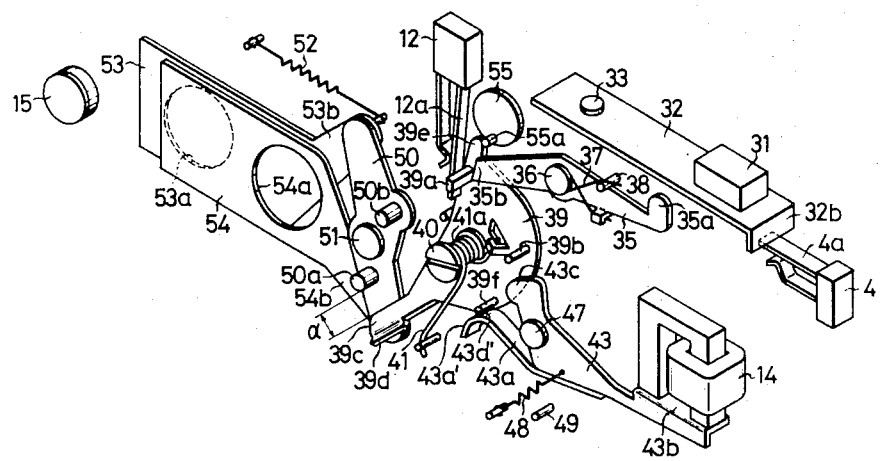
FIG. 3 is a perspective view showing a modification of the embodiment of FIG. 1 as the parts are seen in opposite direction to FIG. 1.

FIG. 3 shows a modified construction in which when the attraction piece 43b of an attraction member 43 is to be pressed against the attracting face of the electromagnet 14 by a shutter cocking operation, the driven arm 43a, made of an elastic plate, of the member 43 is pushed by a pin 39f on a shutter drive member 39, so that in an overcocked position the pressing force will be absorbed by the elastic deformation of the driven arm 43a.

In FIG. 3 showing the shutter in its cocked position, the depression of the shutter button 1 elastically deforms an elastic seat plate 32 supported by a pin 33 on the camera body (not shown), causing its bent end 32b to push down the movable contact member 4a of the main switch 4 (see FIG. 2) and to thereby close the switch 4 for energization of the electromagnet 14. At the same time, the seat plate 32 pushes the driven portion 35a of a shutter latch lever 35 retained in position by a stopper 38 to turn the lever 35 clockwise about a pin 36 against a spring 37. This unlatches a pin 39a on a shutter drive member 39 from a tail end 35b and frees the member 39 from its cocked position.

Consequently, the shutter drive member 39 pivoted to a pin 40 on the camera body and biased by a spring 41 in a clockwise direction is initiated into a clockwise movement. Subsequently, until the actuating arm 39c of the member 39 comes into engagement with a shutter opening pin 50a on a shutter opening and closing member 50, an operation delaying effect is achieved by delaying means involving the distance $\alpha$ between the arm 39c and the pin 50a and a governor 55 having a pin 55a in engagement with a projection 39e. Upon completion of the operation of the delaying means, the shutter drive member 39 turns at a high speed, bringing the actuating arm 39c into engagement with the shutter opening pin 50a on the shutter opening and closing member 50 to force out the pin 50a from the path of advance of the arm 39c. As a result, the opening and closing member 50 pivotally moves about a pin 51 against a spring 52 in a clockwise direction, causing shutter blades 53 and 54 connected at arms 53b and 54b to the member 50 to slidingly move in opposite directions to each other to overlap the shutter openings 53a and 54a. The shutter is therefore opened.

The clockwise turning of the drive member 39 thus initiated opens the count switch 12 which has been closed by the pin 39a pushing the movable contact member 12a, whereupon the operation to charge the capacitor C starts by way of the photocell 15.

If the subject has a high brightness, the resistivity of the photocell 15 will be low and the capacitor C will be charged up completely while an operation delaying action is being effected by the distance $\alpha$ and the governor 55, so that the switching circuit 16 functions to de-energize the electromagnet 14. During the operation delaying action, therefore, the influence of the delayed action of the electromagnet 14 or the inertia of the attraction member 43 is eliminated. Since the initiation of clockwise turning of the shutter drive member 39 has already disengaged the pin 39f from the driven arm 43a, a spring 48 turns the attraction member 43 clockwise about a pin 47 and retracts the latch arm 43c of the member 43 from the path of clockwise movement of a pin 39b on the drive member 39. Accordingly, the drive member moves in a clockwise direction rapidly without interruption, opening the shutter to a full extent and bringing the actuating arm 39c into engagement with a shutter closing pin 50b. When the actuating arm 39c has moved past the position of the shutter opening pin 50a by forcing out the pin 50a from the path of its movement, the shutter opening and closing member 50 immediately starts to move pivotally in a counterclockwise direction under the action of the spring 52 and to close the shutter. The engagement of the actuating arm 39c with the closing pin 50b further accelerates the counterclockwise pivotal movement to close the shutter quickly. Moreover, the engagement of the arm 39c with the closing pin 50b permits the spring 41 to elastically press the closing pin 50b upon completion of the shutter closing action, preventing bouncing of the shutter opening and closing member 50 and reexposure.

On the other hand, if the subject has a lower brightness requiring a medium or low shutter speed, the resistivity of the photocell 15 is higher than the above and a longer time is required to charge up the capacitor C. Thus when the shutter has been fully opened by the actuating arm 39c of the drive member 39, energizing current is still flowing through the electromagnet 14. Therefore, the attraction member 43 has its attraction piece 43b still attracted and its latch arm 43c positioned in the path of clockwise movement of the pin 39b on the shutter drive member 39. The shutter drive member 39 keeps the shutter fully open, with the shutter opening pin 50a located at the distal end of the actuating arm 39c, and is temporarily stopped against clockwise turning by the engagement of the pin 39b with the latch arm 43c. In this way the shutter opening and closing member 50 is prevented from counterclockwise movement to hold the shutter fully open.

The capacitor C is charged up to the specified voltage upon lapse of a time corresponding to the brightness of the subject, when the switching circuit 16 functions to interrupt the supply of current to the electromagnet 14 and deenergize the magnet 14. This frees the attraction piece 43b from engagement with the magnet 14, permitting the attraction member 43 to swing clockwise under the action of the spring 48 and to unlatch the shutter drive member 39 from the arm 43c. The shutter drive member 39 starts to turn clockwise again, moving the actuating arm 39c out of engagement with the shutter opening pin 50a toward the shutter closing pin 50b and allowing the shutter to start closing. The arm 39c urges the shutter closing pin 50b to instantaneously complete the shutter closing action. During the operation described, it is noted that the clockwise turning of the attraction member 43 frees the shutter drive member 39 from the position where the member 39 retains the shutter in its full-open state. Although the spring 48 is weaker than the spring 41, the clockwise turning of the attraction member 43 can be effect free of trouble, by suitably determining the position of the engagement of the latch arm 43c with the pin 39b, with respect to the arrangement of the pin 47 for the member 43 and the pin 40 for the drive member 39. To avoid the advance of the driven arm 43a into the path of movement of the pin 39b by virtue of the clockwise turning of the attraction member 43, the radius of rotation of the pin 39a on the drive member 39 about the center of rotation of the member 39 is made smaller than the radius of rotation of the pin 39f, whereby the clockwise motion of the pin 39b will be assured free of interference with the driven arm 43a.

When relieved of the pressure, the shutter button 31 is returned upward by the elastic seat plate 32, which simultaneously opens the main switch 4 and permits the shutter latch lever 35 to return counterclockwise into engagement with the stopper 38.

To cock the shutter, the shutter drive member 39 is turned in a counterclockwise direction by an unillustrated shutter cocking member.

The shutter cocking operation moves the shutter drive member 39 in a counterclockwise direction. First, a curved edge 39d along the rear side of the actuating arm 39c rides on the shutter opening pin 50a against the action of the coiled portion 41a of the spring 41 and passes over the same as already described without opening the shutter. Further the pin 39f on the drive member 39 comes into engagement with the slanting portion 43a' of driven arm 43a of the attraction member 43 which is retained in contact with the stopper 49, pushing the arm 43a to turn the attraction member 43 in a counterclockwise direction. Approximately at the cocked portion, the attraction piece 43b is pressed against the attracting face of the electromagnet 14.

Just before the completion of shutter cocking operation, the projection 39e comes into engagement with the pin 55a of the governor 55, while the pin 39a pushes the movable contact member 12a of the count switch 12 to close the switch.

To latch the shutter drive member 39 at its cocked position, the member 39 must be turned to the overcocked position as already described. The tail end 35b of the shutter latch lever 35 pushed up by the pin 39a is brought into the path of clockwise movement of the pin 39a when the pin 39a has moved past to the overcocked position and latches the pin 39a which slightly turns clockwise upon completion of the cocking operation. In the overcocked state described, the pin 39f on the shutter drive member 39 moves from the slanting portion 43a' up onto the bent portion 43a'' of the driven arm 43a, whereby the driven arm 43a undergoes elastic deformation to prevent an excess pressure acting between the attraction piece 43b and the attracting face of the electromagnet 14. When the shutter is completely cocked, the pin 39f rests on the bent portion 43a'' as illustrated, bringing the attraction piece 43b into intimate contact with the attracting face of the electromagnet 14 against the spring 48. The latch arm 43c is positioned in the path of clockwise motion of the pin 39b.

Figure 4:
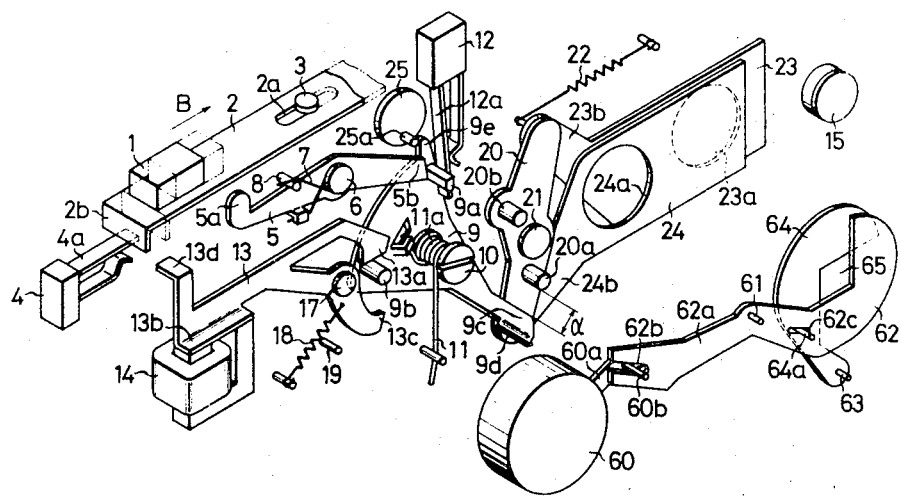
FIG. 4 is a perspective view showing another embodiment of this invention.
Figure 5:
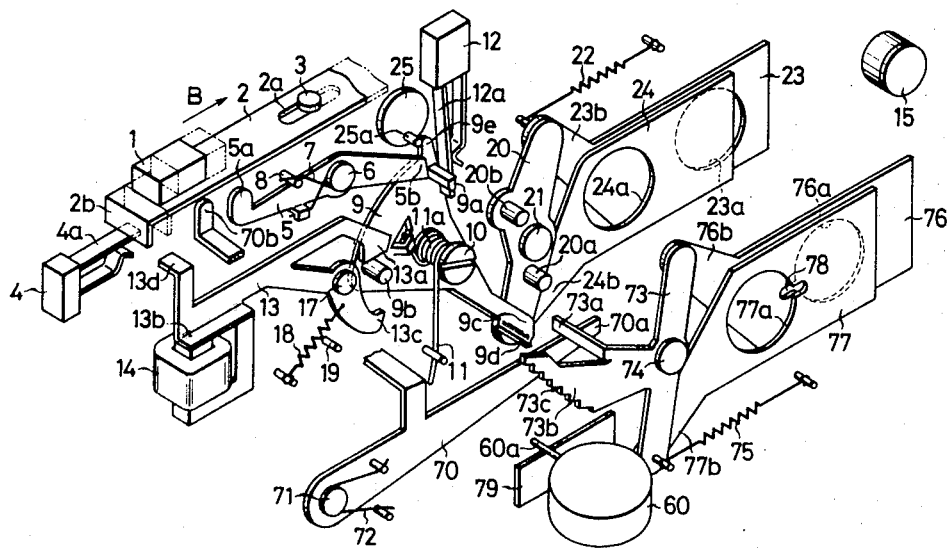
FIG. 5 is a perspective view showing another embodiment of this invention.
Figure 6:
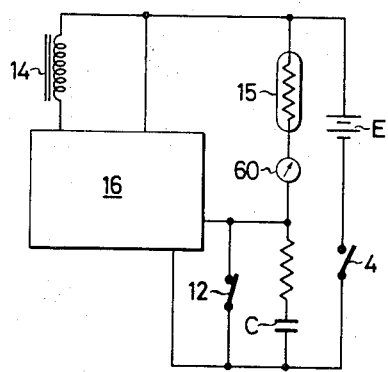
FIG. 6 is a diagram showing an exposure time control electric circuit for the embodiments of FIGS. 4 and 5.

FIGS. 4 and 5 show embodiments which comprise the electronic shutter described and in which the operation of the diaphragm blades is controlled by an ammeter 60 so that within a range of brightness of the subject higher than a specified brightness the shutter operates as a program shutter of the constant shutter speed type wherein the diaphragm aperture size is controlled at a constant shutter speed, and for subjects of a lower brightness the shutter operates as a program shutter of the shutter speed control type at a full diaphragm aperture value. As shown in FIG. 6, the ammeter 60 is connected in series with the circuit of the photocell 15 whose resistivity changes in corresponding relation to the brightness of the subject.

In FIG. 4, the same parts as in FIG. 1 which are referred to by the same reference numerals and characters operate in the same manner as in FIG. 1.

The depression of the shutter button 1 closes the main switch 4. It will be understood from the electric circuit of FIG. 6 (which is different from the electric circuit of FIG. 2 in that the ammeter 60 is connected in series with the circuit of the photocell 15) that current is supplied to the electromagnet 14 to cause the electromagnet 14 to attract the attraction piece 13b and to thereby hold the attraction member 13 in the illustrated attracted position. At the same time, current passes through the ammeter 60 by way of the photocell 15 whose resistivity varies in accordance with the brightness of the subject. The pointer 60a of the ammeter therefore swings. The higher the brightness of the subject, the lower will be the resistivity of the photocell 15, whereas the lower the brightness, the higher will be the resistivity. Accordingly, the higher the brightness of the subject, the greater will be the angle of deflection of the pointer 60a, while the darker the subject, the smaller will be the angle of deflection.

The pointer 60a carries at its tip a pin 60b which engages in the bifurcated tail end 62b of arm 62a of a disphragm blade 62. The diaphragm blade 62 is pivoted to a pin 61 on the unillustrated camera body, so that the deflection of the pointer 60a swings the diaphragm blade 62 through an angle corresponding to the angle of deflection.

The camera body further pivotally supports by a pin 63 another diaphragm blade 64 mating with the diaphragm blade 62. The blade 64 has a pin 64a engaged in a slot 62c in the blade 62 so as to be movable in operative relation to the swinging of the blade 62 and to thereby vary the size of a diaphragm aperture 65.

Thus in response to a bright subject, the photocell 15 exhibits a low resistivity, permitting a great current to flow through the ammeter 60 and therefore deflecting the pointer a great deal in a clockwise direction to reduce the size of the diaphragm aperture 65. As the brightness of the subject lowers, the resistivity of the photocell 15 increases to reduce the angle of clockwise deflection of the pointer 60a and to thereby enlarge the diaphragm aperture 65.

The depression of the shutter button 1 further turns the shutter latch lever 5 in a counterclockwise direction, initiating the shutter drive member 9 into a counterclockwise motion, whereby the count switch 12 is opened to start charging of the capacitor C by way of the photocell 15. Although the charging current flows from the photocell 15 through the ammeter 60 to the capacitor C, the internal resistance of the ammeter 60 is so low that it is negligible.

At the initial stage of counterclockwise turning of the shutter drive member 9, an operation delaying effect is produced by the delaying means such as the distance $\alpha$ between the actuating arm 9c and the pin 20a or the governor 25. The size of diaphragm aperture 65 has already been determined by the value of current flowing through the ammeter 60 by way of the count switch 12. If the brightness of the subject is higher than the specified value, the electromagnet 14 has been deenergized,
permitting the attraction member 13 to turn clockwise under the action of the spring 18 with its latch arm 13c retracted from the path of counterclockwise movement of the pin 9b. The shutter is therefore tripped at the highest speed as already described. In brief, the shutter operates as an electronic shutter of the constant shutter speed type wherein the diaphragm aperture size is controlled by the ammeter 60 at a constant shutter speed.

If on the other hand the brightness of the subject is lower than in the foregoing case, the charging current for the capacitor C will be controlled by the high resistivity of the photocell 15 and the current flowing through the ammeter 60 will consequently be of a low value. This greatly reduces the angle of deflection of the pointer 60a and opens the diaphragm aperture 65 to almost full extent. In this case, the counterclockwise movement of the shutter drive member 9 is interrupted temporarily by the attraction member 13 held attracted to the electromagnet 14, at the position where the shutter is fully opened. Subsequently, the charged voltage in the capacitor C reaches the specified value, causing the switching circuit 16 to interrupt the supply of current to the electromagnet 14 and to nullify the attraction, whereupon the shutter drive member 9 starts to turn counterclockwise again and a shutter closing action is initiated.

Thus for subjects whose brightness is lower than the specified value, the shutter operates as a program shutter of the shutter speed control type wherein the shutter speed is controlled with the diaphragm aperture fully opened.

As previously described, a bulb exposure can be made by shifting the shutter button 1 and the elastic seat plate 2 to the illustrated phantom line position as indicated by the arrow B and then tripping the shutter. Since the main switch 4 in this case is left open, the pointer 60a will not swing and a photograph will be taken with the diaphragm aperture fully opened.

The shutters will be cocked exactly in the same manner as in FIG. 1.

According to the construction described above with reference to FIG. 4, the operation of the diaphragm blades 62 and 64 is directly controlled by the pointer 60a of the ammeter to determine the diaphragm aperture size, while FIG. 5 shows a shutter wherein the size of diaphragm aperture is changed by detecting the position of the pointer 60a. The electric circuit of FIG. 6 described with reference to FIG. 4 can be applied as it is to the embodiment of FIG. 5 for controlling the exposure time.

In FIG. 5, the same parts as shown in FIGS. 1 and 4 are referred to by the same reference numerals and characters and they operate in the same manner as in FIGS. 1 and 4.

Referring to FIG. 5, there is provided a diaphragm operating lever 70 adapted to be turned in a clockwise direction by the depression of the shutter button 1 through the elastic seat plate 2. The diaphragm operating lever 70 is pivotally supported by a pin 71 on the camera body and urged by a spring 72 in a counterclockwise direction. The lever has a distal end 70a which normally pushes up the arm 73a of a diaphragm actuating member 73 and a driven arm 70b located under the elastic seat plate 2. The depression of the shutter button 1 pushes down the end of the arm 70b and turns the lever 70 clockwise as stated above.

The diaphragm actuating member 73 is pivotally supported by a pin 74 on the camera body and is biased in a counterclockwise direction by a spring 75 that is weaker than the spring 72, with its arm 73a bearing against the distal end 70a of the diaphragm operating lever 70. The diaphragm actuating member 73 is connected at its one end to the arm 76b of a diaphragm blade 76 having a diaphragm opening 76a and, at the other end, to the arm 77b of a diaphragm blade 77 having a diaphragm opening 77a, such that the pivotal movement of the member 73 slidingly moves the blades 76 and 77 in directions opposite to each other. Normally before the shutter is tripped, the openings 76a and 77a are entirely out of overlapping relation to close the diaphragm aperture or the openings 76a and 77a are overlapped to such an extent as to give a minimum diaphragm aperture 78. The diaphragm actuating member 73 further has a sector arm 73b formed along its periphery with a steplike portion 73a disposed above the pointer 60a of the ammeter. The pointer 60a of the ammeter is so arranged as to be swingable in a horizontal direction below the steplike portion 73c. A support plate 79 is disposed under the pointer 60a.

The shutter button 1, when depressed, closes the main switch 4, causing the pointer 60a of the ammeter to swing in a clockwise direction through an angle corresponding to the brightness of the subject and, at the same time, energizing the electromagnet 14 which in turn attracts the attraction member 13 in the illustrated position. The diaphragm operating lever 70 turns in a clockwise direction. Further the shutter latch lever 5 turns counterclockwise to unlatch the shutter drive member 9, whereupon the drive member starts to turn in a counterclockwise direction to open the count switch 12 and to thereby energize the light measuring integration circuit comprising the photocell 15 and the capacitor C. (The resistance of the ammeter 60 will not be taken into consideration.) Due to the action of the governor 25 or the like, the shutter has not been initiated into an opening action yet.

The diaphragm actuating member 73 follows the clockwise movement of the diaphragm operating lever 70 to turn in a counterclockwise direction under the action of the spring 75, slidingly moving the diaphragm blades 76 and 77 in opposite directions and thereby opening the diaphragm aperture 78.

Positioned under the steplike portion 73c of sector arm 73b of the diaphragm actuating member 73 is the pointer 60a which has been deflected in corresponding relation to the brightness of the subject. By virtue of the counterclockwise turning of the member 73, the steplike portion 73c presses the pointer 60a against the support plate 79. At this position the counterclockwise movement of the member 73 stops to determine the size of the diaphragm aperture. In other words, the angle of deflection of the pointer 60a determines the diaphragm aperture size.

If the subject has a brightness higher than the specified value, the electromagnet 14 will be energized only for a very short time. Thus, before the pin 9b on the shutter drive member 9 reaches the position of the latch arm 13c of the attraction member 13, the attraction member 13 can retract so as not to latch the shutter drive member 9 at the position where it opens the shutter to the full extent. In the meantime, the delaying means functions. Accordingly, the shutter opens and closes at the highest speed. On the other hand, before the shutter opening and closing action takes place, the diaphragm blades 76 and 77 have its aperture determined by the angle of deflection of the pointer 60a in correspondng relation to the brightness of the subject. Briefly, in the case where the brightness of the subject is higher than the specified value, the shutter functions as an electronic program shutter in which the size of the diaphragm aperture 78 is controlled by the pointer 60a of the ammeter at a constant shutter speed.

If the brightness of the subject is in a range lower than the specified value, the photocell 15 exhibits a high resistivity and the pointer 60a swings a small angle, so that the pointer 60a will not advance to the path of counterclockwise turning of the steplike portion 73c of the diaphragm actuating member 73, with the result that the actuating member 73 turns counterclockwise until it fully opens the diaphragm aperture 78, whereupon it is stopped.

Since the brightness of the subject is lower than the specified value, the attraction member 13 is held attracted to the electromagnet 14, latching the shutter drive member 9 at the position where the shutter is fully open. Upon deenergization of the electromagnet 14 due to the lapse of the time determined by the time constant of the light measuring intergration circuit, the drive member is released, starting to close the shutter. To sum up, if the subject has a brightness lower than the specified value, the apparatus acts as an electronic program shutter wherein the shutter speed is controlled with diaphragm aperture fully opened.

When making a bulb exposure by sliding the shutter button 1 in the direction of the arrow B, the depression of the shutter button 1 does not close the main switch 4 and accordingly, the pointer 60a does not swing, causing the clockwise turning of the diaphragm operating lever 70 to swing the diaphragm actuating member 73 in a counterclockwise direction until the diaphragm aperture is opened to a full size.

As previously described, the attraction member 13 has its bent portion 13d depressed by the bent end 2b of the elastic seat plate 2, whereby the attraction piece 13b is pressed against the attracting face of the unenergized electromagnet 14 to latch the shutter drive member 9 at the position where the shutter is fully open. When the shutter button 1 is relieved of the depressing force, the attraction member 13 turns in a clockwise direction to latch out the shutter drive member 9 and initiate the shutter into closing action.

When the photographic operation is completed in the foregoing manner in corresponding relation to the brightness of the subject, the shutter button 1 is freed from the depressing force, whereupon the diaphragm operating lever 70 returns counterclockwise direction under the action of the spring 72, causing its distal end 70a to push up the arm 73a of the diaphragm actuating member 73 against the spring 75 and thereby turning the member 73 clockwise to reduce the diaphragm aperture to a minimum size or to close the same completely.

The shutter will be cocked exactly in the same manner as in the case of FIG. 1.

Figure 7:
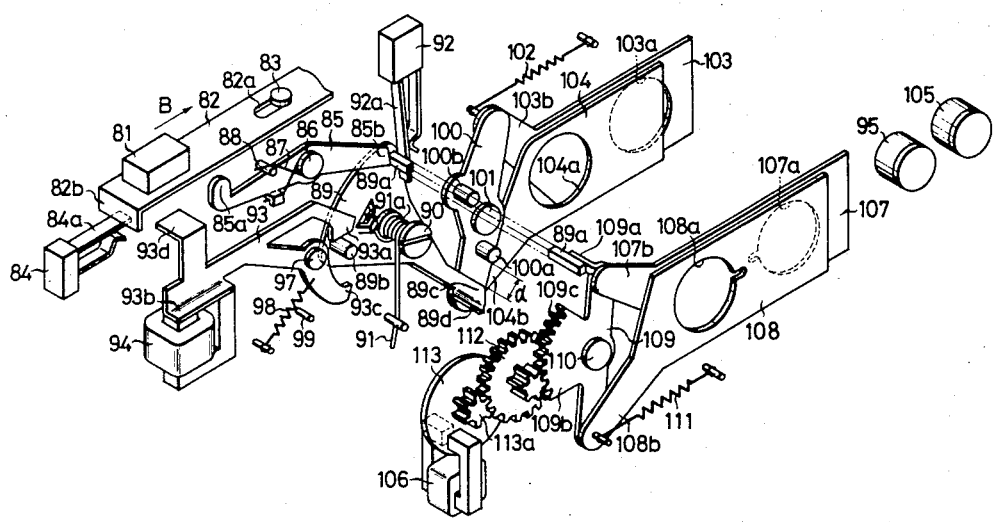
FIG. 7 is a perspective view showing another embodiment of this invention.
Figure 8:
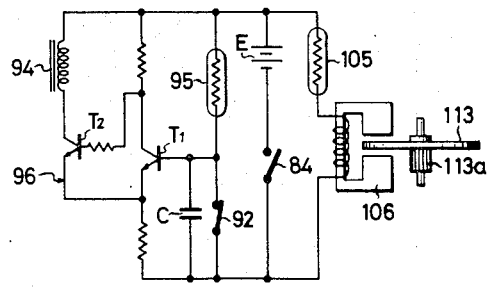
FIG. 8 is a diagram showing an electric circuit for controlling the same.

FIG. 7 shows another electronic program shutter wherein, in addition to a photocell 95 included in a light measuring integration circuit and having resistivity variable upon detecting the brightness of the subject to control exposure time, there is provided another photocell 105 for detecting the brightness of the subject. As seen in FIG. 8, an electromagnet 106 has a winding connected in series with the photocell 105 to have its magnetic force controlled by the variation of resistivity of the photocell 105, such that the electromagnet 106 brakes the diaphragm aperture opening action of diaphragm blades 107 and 108.

FIG. 7 shows the parts as the shutter is in its cocked position. An elastic seat plate 82 is supported on the camera body (not shown) by a pin 83 extending through a slot 82a. The depression of a shutter button 81 elastically deforms the seat plate 82, causing its bent end 82b to push down the movable contact member 84a of a main switch 84 and to close the electric circuit shown in FIG. 8. A shutter latch lever 85 is pivotally supported by a pin 86 on the camera body and is urged in a clockwise direction by a spring 87. The lever 85 is retained in position by a stopper 88. Simultaneously with the foregoing operation, the driven portion 85a of the lever 85 is pushed down by the under face of the elastic seat plate 82, whereby the lever 85 is turned in a counterclockwise direction against the spring 87.

As will be apparent from FIG. 8, upon closing the main switch 84, an electromagnet 94 is energized with current from a power source E, and a magnetic force corresponding to the resistivity of the photocell 105 is produced in the other electromagnet 106. More specifically, if the subject has a high brightness, the photocell 105 exhibits a low resistivity, permitting a great current to flow through the winding of the electromagnet 106, hence a great magnetic force. As the brightness of the subject reduces, the resistivity of the photocell 105 increases, resulting in a corresponding decrease in the magnetic force of the magnet 106.

The electromagnet 94, when energized, attracts the attraction piece 93b of an attraction member 93 to hold the attraction member 93 in the illustrated position. The attraction member 93 is pivoted to a pin 97 on the camera body and is urged by a spring 98 in a clockwise direction, but it is held against clockwise turning by the attraction. Thus the member 93 has its latch arm 93c positioned in the path of counterclockwise movement of a pin 89b on a shutter drive member 88. Indicated at 99 is a stopper for limiting the clockwise turning of the attraction member 93.

The shutter drive member 89 is pivoted to a pin 90 on the camera body and is urged by a spring 91 in a counterclockwise direction, the member 89 further being urged in the axial direction of the pin 90 by the winding portion 91a of the spring 91. Thus as is the case with the shutter drive member 9 in FIG. 1, the member 89 is adapted to pass over the shutter opening pin during the shutter cocking operation as previously described.

The counterclockwise movement of the shutter latch lever 85 retracts the tail end 85b thereof from the path of counterclockwise movement of a pin 89a, freeing the shutter drive member 89 from the cocked position and bringing the same into counterclockwise movement. This removes pressure from the movable contact member 92a of a count switch 92 and opens the switch 92 to initiate charging of the capacitor C by way of the photocell 95.

Simultaneously with the opening of the count switch 92, the movement of the shutter drive member 89 starts the operation of a diaphragm actuating member 109.

The diaphragm actuating member 109, pivotally supported by a pin 110 on the camera body, is connected at its upper and lower ends to the arms 107b and 108b of diaphragm blades 107 and 108. The turning of the member 109 slidingly moves the diaphragm blades 107 and 108 in opposite directions to each other. The free end of a spring 111 is connected to the lower end of the member 109 to urge the member 109 in a counterclockwise direction. The bent upper end 109a of the member 109 is in engagement with the distal end of the pin 89a on the shutter drive member 89. The diaphragm actuating member 109 therefore follows the counterclockwise turning of the drive member 89 to turn counterclockwise. When the shutter is in its cocked position, the member 109 is held in the illustrated latched position by the pin 89a in pushing engagement with the bent end 109a. In the illustrated state, diaphragm openings 107a and 108a formed in the diaphragm blades 107 and 108 respectively are out of register to keep the diaphragm aperture closed. The blades may also be so arranged that they give a minimum aperture size in this state.

The diaphragm actuating member 109 further has a sector arm 109b formed along its periphery with a sector gear 109c so as to drive a pinion 113a fixed to an electroconductive rotary disc 113 by way of an intermediate gear 112. Thus the member 109, when turning, rotates the disc 113 in operative relation thereto. The rotary disc 113 has its periphery interposed between the magnetic poles of the electromagnet 106 whose magnetic force is variable in accordance with the resistivity of the photocell 105.

The energization of the electromagnet 106 produces, between the magnet and the disc 113, an eddy current, which brakes the rotation of the rotary disc 113 to vary the speed of sliding movement of the diaphragm blades 107 and 108 effected by the diaphragm actuating member 109 and to thereby control the rate of increase in the diaphragm aperture area given by the overlapping openings 107a and 108a.

The braking force acting on the rotary disc 113 varies nearly in proportion to the intensity of the eddy current, namely to the magnitude of the magnetic force of the electromagnet 106. The higher the brightness of the subject, the greater will be the magnetic force, whereas the darker the subject, the smaller will be the magnetic force. It therefore allows that the brighter the subject, the lower will be the speed of rotation of the rotary disc and the lower will be the rate of increase in the aperture area.

Figure 9:
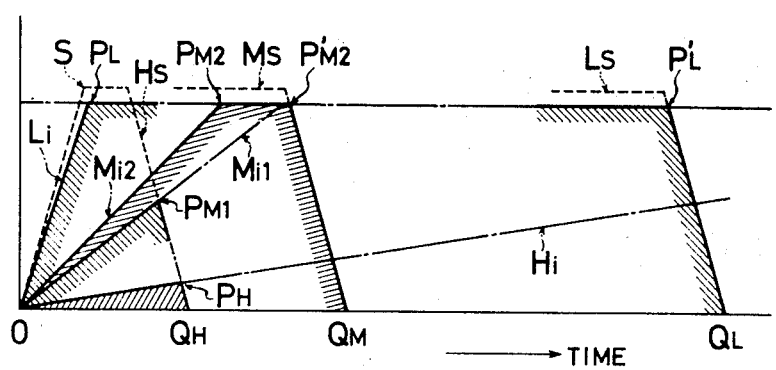
FIG. 9 is a diagram showing the operation of the same.

With reference to FIG. 9, if the subject is very bright, the diaphragm aperture size progressively increases, with the lapse of time, along the line Hi in the drawing. If the subject is darker, the aperture size increases at a higher rate along the line Mi1 in the drawing to reach a maximum value. If the subject is still darker, the aperture size increases at a still higher rate to the maximum value along the line Mi2 in the drawing. If the subject has still lower brightness and requires a long-time exposure, the electromagnet will have a low magnetic force to result in a fairly low braking force on the rotary disc 113, so that the diaphragm blades 107 and 108 will slide along at a high speed. Therefore, the aperture size increased rapidly to the maximum value along the line Li in the drawing.

In the case where the subject has a brightness higher than a specified value, the capacitor C will be charged up to a given voltage level within a very short period of time after the opening of the count switch 92, whereupon a switching circuit comprising transistors T1 and T2 deenergizes the electromagnet 94. Consequently, before the pin 89b on the shutter drive member 89 reaches the illustrated position of the latch arm 93c, the attraction member 93 is freed from the attraction of the electromagnet 94 and turns clockwise under the action of the spring 98 to retract from the path of advance of the pin 89b. The shutter drive member 89 therefore causes its actuating arm 89c to push out a shutter opening pin 100a on a shutter opening and closing member 100 from the path, thereby turning the member 100 counterclockwise to open the shutter to a full extent. The drive member 89 further continues to turn in a counterclockwise direction without being stopped at this position, permitting the shutter opening and closing member 100 to be initiated into clockwise movement by a spring 102. The shutter starts to close therefore. At this time, the actuating arm 89c pushes a shutter closing poin 100b to accelerate the clockwise movement of the member 100 and complete the shutter closing action. In this way, the shutter opens and closes as schematically represented by the trapezoidal lines HS in FIG. 9, giving an exposure time corresponding to the distance from the point 0 where the shutter starts to open to the point QH where the shutter completely closes. In brief, this exposure time is given by the highest shutter speed. In the case where the subject is very bright, the diaphragm aperture size (aperture area) increases progressively as represented by the line Hi, while the shutter operates as represented by the line HS. Accordingly, the amount of exposure at this time will be represented by the area of a hatched section defined by the line connecting together the point O where the shutter blades and diaphragm blades start to open (assuming that the shutter blades and diaphragm blades are initiated into action almost at the same time), the intersection PH of the lines Hi and HS, and the point QH where the shutter completely closes.

If the brightness of the subject is slightly lower than the above and that higher than a specified value, the shutter will then operate at the highest speed as in the foregoing case, as represented by the line HS in FIG. 9. However, inasmuch as the resistivity of the photocell 105 is slightly higher to somewhat lower the magnetic force of the electromagnet 106, the diaphragm aperture enlarges at a higher speed as represented by the line Mi1 in FIG. 9 that is steeper than the line Hi. In other words, the diaphragm opens to the maximum size within a shorter period of time.

Supposing that the shutter and diaphragm open at the same time upon depression of the shutter button 81, the amount of exposure at this time will be represented by the area surrounded by the line connecting together the point O where the shutter blades and diaphragm blades start to open, the intersection PM1 of the lines Mi1 and HS, and the point QH where the shutter closing action is completed.

Next if the brightness of the subject is slightly lower than the specified brightness, the shutter drive member 89, initiated into movement upon the depression of the shutter button 81, will be prevented from the counterclockwise turning motion when the actuating arm 89c engages the shutter opening pin 100a at the full-open position of the shutter, by virtue of engagement of the pin 89b with the latch arm 93c of the attraction member 93 attracted by the electromagnet 94. Subsequently, the voltage of the capacitor C charged by way of the photocell 95 reaches a predetermined value to deenergize the electromagnet 94, whereupon the shutter drive member 89 is freed from engagement with the attraction member 93 to initiate and complete shutter closing action. In this case, the shutter speed can be represented by the time from point O to point QM in FIG. 9. The shutter starts to open at the point O in FIG. 9, continues its operation along the trapezoidal line MS in FIG. 9 and closes at the point QM.

With respect to the diaphragm, the photocell 105 exhibits a high resistivity to lower the magnetic force of the electromagnet 106, producing a lower braking force on the rotary disc 113 with an eddy current. As a result, the diaphragm enlarges its aperture at a still higher rate along the line Mi2 in FIG. 9 that is steeper than the line Mi1, giving a maximum aperture size at the point PM2.

Thus in this case the amount of exposure can be represented by the area surrounded by the line connecting together the point O, the point PM2, the intersection P'M2 of the line MS and the line representing the maximum aperture size where the shutter has already started to close, and the point QM where the shutter completely closes.

If the brightness of the subject is still lower requiring a long-time exposure, the electromagnet 94 will be kept energized for a prolonged period of time, maintaining the shutter in the full-open position for a longer time. Thus as represented by the line LS in FIG. 9, the shutter starts to open at the point O and closes completely at the point QL.

As regards the diaphragm, the high resistivity of the photocell 105 causes the magnet 106 to produce a low magnetic force and an eddy current which exerts a low braking force on the rotary disc 113. For this reason, the diaphragm aperture enlarges at a higher rate than in the previous case, as represented by the line Li that is steeper than the line Mi2, giving the maximum size at the point PL.

Consequently, the amount of exposure obtained will be represented by the area defined by the line connecting together the point O, the point PL, the point P'L where the line LS intersects the line of the maximum aperture size, and the point QL.

It will be apparent from the above that the embodiment of FIG. 7 operates as an electronic shutter of the program type wherein the amount of exposure is determined in accordance with the brightness of the subject to give a proper amount of exposure to the film. As in the case of FIG. 1, it is very effective to incorporate into the apparatus the delaying means such as the distance α for delaying the operation of the shutter drive member 89 when it is initiated into operation.

To make a bulb exposure with the embodiment of FIG. 7, the shutter button 81 and elastic seat plate 82 are slidingly shifted in the direction of the arrow B as in FIG. 1, or the elastic seat plate 82 alone may be shifted in the direction of the arrow B to position the bent end 82b above the bent driven portion 93d of the attraction member 93. The shutter button 81 when depressed presses the attraction piece 93b of the attraction member 93 against the attracting face of the electromagnet 94, whereby the member 93 is retained at the same position as when it is magnetically attracted.

Upon depression of the shutter button 81, the shutter drive member 89 starts to turn counterclockwise and is then latched by the attraction member while retaining the shutter in the full-open position.

The diaphragm actuating member 109 follows the foregoing movement of the shutter drive member 89 to turn counterclockwise. In spite of the depression of the shutter button 81, the main switch is left open at this time, so that neither of the electromagnets 94 and 106 is energized. Consequently, the electromagnet 106 does not exerts the braking force on the rotary disc 113, with the result that the diaphragm aperture opens to the maximum size rapidly to expose the film with both the diaphragm and the shutter fully opened.

When the shutter button 81 is freed from the depression, the attraction member 93 is released from the retained position, permitting the shutter drive member 89 to start to turn counterclockwise again. The shutter therefore closes to complete the photographing operation.

To cock the shutter, an unillustrated cocking member is operated to turn the shutter drive member 89 in a clockwise direction.

When the actuating arm 89c of the member 89 reaches the position of the shutter opening pin 100a during the clockwise turning, a curved edge 89d formed along the rear side of the actuating arm 89c enables the arm 89c to pass over the shutter opening pin 100a in exactly the same manner as in FIG. 1, without opening the shutter. The pin 89b thereafter pushes the driven arm 93a of the attraction member 93 to turn the member 93 in a counterclockwise direction. The distal end of the pin 89a pushes the bent end 109a of the diaphragm actuating member 109 and turns the member 109 clockwise, slidingly moving the diaphragm blades 107 and 108 in directions to close the diaphragm aperture. Immediately before the completion of shutter cocking, the pin 89a pushes the movable contact member 92a of the count switch 92. Upon reaching the cocked position, the member 89 presses the attraction piece 93b against the attracting face of the electromagnet 94. The diaphragm aperture is closed or reduced to a minimum size. When the member 89 subsequently reaches the overcocked position, the tail end 85b of the shutter latch lever 85 advances into the path of counterclockwise movement of the pin 89a. The cocking force is then removed, whereupon the drive member 89 slightly moves in a counterclockwise direction, bringing the pin 89a into engagement with the tail end 85b. Thus the member 89 is completely latched at its cocked position. In the overcocked state, the driven arm 93a of the attraction member 93 undergoes elastic deformation, thereby preventing an excess pressure from acting between the attraction piece 93b and the attracting face of the electromagnet 94.

Figure 10:
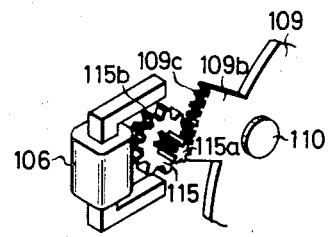
FIG. 10 is a perspective view showing only the modified portion of the embodiment of FIG. 7.

FIG. 10 shows only the main part of a modification of the diaphragm braking mechanism of FIG. 7. Interposed between the magnetic poles of the electromagnet 106 is a rotary disc 115 made of a magnetically sensitive material and toothed along its outer periphery. A pinion 115a fixed to the disc 115 meshes with the sector gear 109c of the diaphragm actuating member 109.

As is the case with FIG. 7, the magnetic force of the electromagnet 106 varies in accordance with the brightness of the subject. The rotary disc 115 is driven by the opening movement of the diaphragm, and when the toothed projection 115b thereof approaches the magnetic pole of the magnet 106, an electromagnetic force acts on the projection 115b to brake the rotary disc 115 with a braking force orresponding to the brightness of the subject.

In FIG. 7, the eddy current between the magnet 106 and the rotary disc 113 exerts a braking force on the disc 113 which force corresponds to the brightness of the subject, whereas in FIG. 10 the magnetic action produces a braking force corresponding to the brightness of the subject to brake the rotation of the rotary disc 115.

Thus the electronic program shutter of FIG. 7 gives a very wide range of exposure amounts ranging from a substantially small amount of exposure at an altrahigh shutter speed to a long-time exposure. The proper amount of exposure given by the long-time exposure can be provided by a shorter time of exposure than conventionally possible to eliminate objections such as camera shake heretofore experienced.

Figure 11:
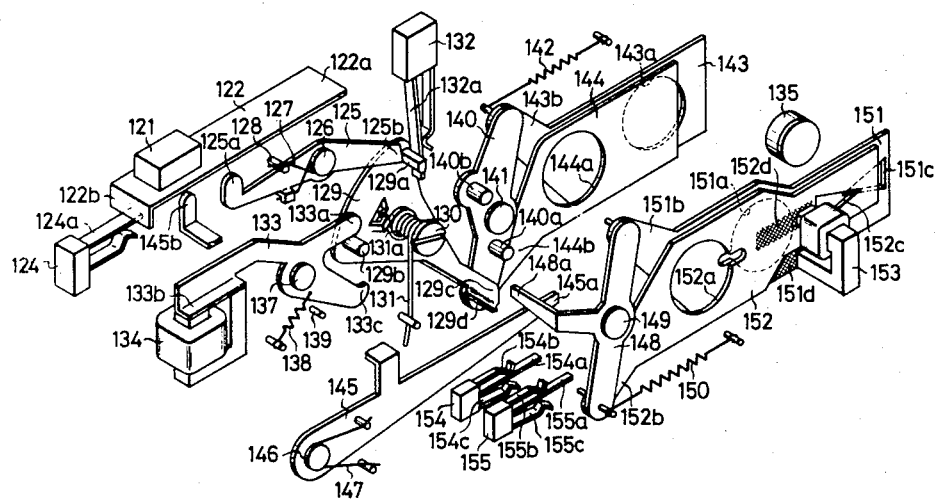
FIG. 11 is a perspective view of still another embodiment of this invention.
Figure 12:
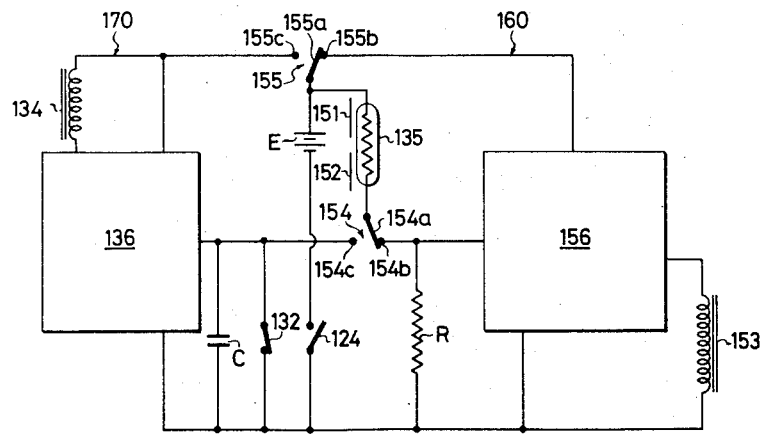
FIG. 12 is a diagram showing an electric circuit for controlling the same.

FIG. 11 shows an electronic shutter of the program type including two changeover switches 154 and 155, such that after the size of diaphragm aperture has been determined by a diaphragm control electric circuit 160 in accordance with the brightness of the subject, an exposure time control electric circuit 170 is energized to control the shutter speed. FIG. 12 shows a control electric circuit including one photocell conjointly used for controlling both the diaphragm and exposure time.

With reference to FIG. 11, the depression of a shutter button 121 elastically deforms an elastic seat plate 122 fixed at it one end 122a to an unillustrated camera body, with its bent end 122b forced down, to push the movable contact member 124a of a main switch 124 and close the switch 124.

Simultaneously with this, the downward movement of the seat plate 122 depresses the driven arm 145b of the diaphragm operating lever 145 thereunder to turn the lever 145 clockwise.

The diaphragm operating lever 145 pivoted at its one end to a pin 146 on the camera body is urged by a spring 147 in a counterclockwise direction and has a distal end 145a in engagement with the under face of arm 148a of a diaphragm acutating member 148. By virtue of the clockwise movement of the lever 145, the end 145a is retracted downward.

The diaphragm actuating member 148 is pivoted to a pin 149 on the camera body and is urged in a counterclockwise direction by a spring 150 that is weaker than the spring 147, whereby the arm 148a is kept in contact with the end 145a of the operating lever 145. Connected to the upper end of the member 148 is the end of arm 151b of a diaphragm blade 151 having a diaphragm opening 151a, light receiving window 151c and attraction portion 151d. There is provided another diaphragm blade 152 having a diaphragm opening 152a and light receiving window 152c, corresponding to the openings 151a and 151c of the blade 151 respectively, and an attraction portion 152d. Where desired, antiskid effect is imparted to the attraction portions. The end of arm 152b of the blade 152 is connected to the lower end of the member 148. The pivotal movement of the member 148 slidingly moves the diaphragm blades 151 and 152 in directions opposite to each other, so that the diaphgram openings 151a, 152a and the light receiving windows 151c, 152c will be overlapped to varying degrees to progressively enlarge the resulting openings respectively, the arrangement being such that when the shutter is in it cocked position the diaphragm aperture and the light receiving window opening formed by overlapping are reduced to a minimum size or are closed.

Thus if the diaphragm operating lever 145 moves in a clockwise direction as described, the diaphragm actuating member 148 follows this movement to turn counterclockwise, increasing the sizes of the diaphragm aperture and the light receiving window opening.

Disposed behind the light receiving windows 151c and 152c is a photocell 135 for detecting the amount of light incident through the opening provided by the windows 151c and 152c. The photocell 135 therefore undergoes variation in its resistivity in response to the light.

Usually, the changeover switches 154 and 155 keep the diaphragm control electric circuit 160 closed by the contact of movable contact members 154a and 155a with stationary contact members 154b and 155b respectively, the circuit 160 including a comparison circuit comprising the photocell 135 and a fixed resistor R. The movable contact members 154a and 155a are positioned in the path of counterclockwise movement of the arm 148a.

Connected to the midpoint of the comparison circuit comprising the photocell 135 and the fixed resistor R is the input terminal of a trigger circuit 156 through which current is applied to an electromagnet 135 when the resistivity of the photocell 135 reaches a certain level, namely when the resistivity is brought into balance with the resistivity of the fixed resistor R, whereupon the electromagnet 153 attracts the diaphragm blades 151 and 152 to it magnetic pole to determine the size of the diaphragm aperture. The antiskid attraction portions 151d and 152d facilitate such attraction by the electromagnet 153, making it sure to retain the diaphragm blades 151 and 152 in the attracted position against the action of the spring 150. The antiskid effect need not be imparted to the attraction portions if the electromagnet has a strong attracting force or if the aforementioned attraction is achieved with sufficiently high friction between the attracting face and the attracted faces. Although both the diaphragm blades 151 and 152 in the foregoing construction are adapted to be attracted by the electromagnet 153 when the diaphragm aperture has been opened to a size corresponding to the brightness of the subject, one of the diaphragm blades 151 and 152 alone may alternatively be adapted to be attracted by the electromagnet 153, such that the other blade is stopped by the diaphragm actuating member 148 at the same time against sliding movement.

If the diaphragm blades 151 and 152 operate as above until the diaphragm aperture and the light receiving opening are opened to their maximum sizes but the resistivity of the photocell 135 is too high to energize the electromagnet 153, the diaphragm blades 151 and 152 are stopped at this position. At the same time, the arm 148a of the diaphragm actuating member 148 pushes the movable contact members 154a, 155a of the changeover switches 154, 155 out of contact with the stationary contact members 154b, 155b into contact with stationary contact members 154c, 155c. Thus the diaphragm control electric circuit 160 is opened while the exposure time control electtic circuit 170 is closed.

Positioned under the elastic seat plate 122 supporting the shutter button 121 is the driven portion 125a of a shutter latch lever 125, which is pivotally supported by a pin 126 on the camera body and is urged by a spring 127 in a clockwise direction into contact with a stopper 128. When the shutter is in its cocked position, the tail end 125b is in engagement with a pin 120a on a shutter drive member 129 to latch the drive member 129 at its cocked position.

After the depression of the shutter button 121 has initiated the diaphragm operating lever 145 into clockwise movement, further depression of the shutter button 121 causes the seat plate 122 to push down the driven portion 125a of the shutter latch lever 125, turning the latch lever 125 in a counterclockwise direction to retract the tail end 125b from the path of movement of the pin 129a during the counterclockwise turning of the shutter drive member 129.

The shutter drive member 129 is pivotally supported by a pin 130 on the camera body and is movable on the pin 130 in the axial direction thereof. The member 129 is biased by a spring 131 in a counterclockwise direction and pressed in one direction against an unillustrated support plate therefor by the coiled portion 131a of the spring 131. The shutter drive member 129 is so designed that its actuating arm 129c will pass over a shutter opening pin 140a during a shutter cocking operation in the same manner as in the foregoing embodiments. The pin 120a on the drive member 129 in its cocked position keeps the count switch 132 of the exposure time control electric circuit 170 closed by pushing the movable contact member 132a of the switch 132. The member 129 carries another pin 129b pushing the driven arm 133a of an attraction member 133 to maintain the attraction piece 133b of the member 133 in proximity to or in intimate contact with the attracting face of another electromagnet 134. In the case where the attraction piece 133b is adapted for intimate contact with the electromagnet 134, the driven arm 133a must be rendered elastically deformable so as to absorb an excess pressure in an event of overcocking.

The attraction member 133 pivotally supported by a pin 137 on the camera body is urged by a spring 138 in a clockwise direction. When the electromagnet 134 is energized, the attraction member 133 is held attracted against clockwise turning, with its latch arm 133c positioned in the path of movement of a pin 129b during the counterclockwise turning of the drive member 129. When the electromagnet 134 is deenergized during the counterclockwise turning of the drive member 129, the spring 138 acts to turn the member 133 clockwise to retract the latch arm 133c from the path of counterclockwise movement of the pin 129b. The arm 133c stops by contact with a stopper 139. In this position, the driven arm 133a is located in the path of movement of the pin 129b when the shutter drive member 129 turns in a clockwise direction by a shutter cocking operation to be described later.

The counterclockwise turning of the shutter latch lever 125, previously mentioned, releases the shutter drive member 129 from its cocked position, whereupon the member 129 turns counterclockwise under the action of the spring 131 and immediately opens the count switch 132. The pin 129b frees the attraction member 133 from engagement therewith. However, if the electromagnet 134 has already been energized, the attraction member 133 is held attracted during energization.

In the path of advance of the arm 129c of the shutter drive member 129 during the counterclockwise turning of the member 129, there is disposed a shutter opening and closing member 140 so that the arm 129c will come into contact with a shutter opening pin 140a and then with a shutter closing pin 140b, the pins being mounted on the member 140.

The shutter opening and closing member 140 is pivoted, at an intermediate portion between the pins 140a and 140b, to a pin 141 on the camera body and is urged by spring 142 in a clockwise direction. The member 140 is connected, at its upper and lower ends, to the arms 43b and 144b of shutter blades 143 and 144 respectively, the blades having shutter openings 143a and 144a. The pivotal movement of the member 140 slidingly moves the shutter blades 143 and 144 in opposite directions to each other. While the shutter is in its cocked position, the openings 143a and 144a are out of overlapping relation to each other to keep the shutter closed.

The counterclockwise movement of the shutter drive member 129 effected by the depression of the shutter button 121 brings the actuating arm 129c into contact with the shutter opening pin 140a to force out the pin 140a from the path of movement of the arm 129c, thereby turning the shutter opening and closing member 140 in a counterclockwise direction. At the time the pin 140a is positioned at the distal end of the arm 129c, the shutter opens to a maximum size.

If the diaphragm aperture has already been opened to the maximum size at this time, with the changeover switches 154 and 155 closed at the stationary contact points 154c and 155c by the diaphragm actuating member 148 as already described, it will be apparent from FIG. 12 that before the count switch 132 is opened, the electromagnet 134 has been energized to hold the attraction member 133 in the attracted position against clockwise turning. Consequently, the latch arm 133c of the member 133 latches the pin 129b on the drive member 129 to interrupt the counterclockwise turning of the member 129, which in turn holds the shutter opening pin 140b in engagement with the distal end of its actuating arm 129c to retain the shutter in full-open state.

At the time the count switch 132 is opened by virtue of the initiation of counterclockwise movement of the shutter drive member 129, a light measuring integration circuit comprising the photocell 135 and a capacitor C connected to the photocell 135 by way of the changeover switch 154 starts to operate. Charging of the capacitor C is therefore initiated. When the charged voltage reaches a specified level, a switching circuit 136 functions to deenergize the electromagnet 134 as already known, permitting the attraction member 133 to start to turn clockwise under the action of the spring 138 and of the spring 131 acting on the shutter drive member 129. Thus the latch arm 133c releases the shutter drive member 129, which therefore further turns in a clockwise direction. Upon the actuating arm 129c moving past the position of the shutter opening pin 140a, the shutter opening and closing member 140 turns in a clockwise direction under the action of the spring 142 to start to close the shutter. The actuating arm 129c now bearing against the shutter closing pin 140b accelerates and completes the shutter closing action and then stops.

If the changeover switches 154 and 155 are not switched in the operation described, namely if the diaphragm opening action of the diaphragm blades 151 and 152 is stopped by the electromagnetic 153 before giving the maximum aperture size, the electromagnet 134 for the attraction member 133 has not been energized, so that the attraction member 133 turns clockwise, following the counterclockwise movement of the shutter drive member 129, to retract its latch arm 133c from the path of movement of the pin 129b. Consequently, the shutter drive member 129 continues to turn in a counterclockwise direction to open and close the shutter at a high speed without being latched at the position where the shutter is fully opened.

It will be apparent from the foregoing description that if the subject has a brightness higher than the specified value, namely if a high-speed exposure is required, the depression of the shutter button 121 closes the main switch 124 and turns the diaphragm operating lever 145 clockwise, permitting the diaphragm actuating member 148 to follow the movement of the lever 145 to enlarge the diaphrgam aperture and the light receiving opening. When the resistivity of the photocell 135 detecting the brightness of the subject through the light receiving opening comes into balance with the resistivity of the fixed resistor R, the trigger circuit 156 energizes the electromagnet 153 to hold the diaphragm blades 151 and 152 attracted and to thereby stop their sliding movement, whereby the diaphragm aperture size is determined. Subsequently, further depression of the shutter button 121 causes the shutter latch lever 125 to initiate the shutter drive member 129 into counterclockwise movement. SInce the changeover switches 154 and 155 have not been switched, the electromagnet 134 is kept unenergized, so that the drive member 129 opens and closes the shutter at a high speed without being prevented from its counterclockwise movement by the attraction member 133. Accordingly, the shutter in this state operates as an electronic program shutter of the constant shutter speed type wherein the diaphragm aperture size is automatically variable in accordance with the brightness of the subject as a constant shutter speed.

On the other hand, if the brightness of the subject is lower than the specified value, namely if the control of the diaphragm aperture size alone fails to give a proper amount of exposure but gives an underexposure, the resistivity of the photocell 135 is too high to come into balance with the resistivity of the fixed resistor R even when the depression of the shutter button 121 opens the diaphragm aperture and the light receiving opening to a full extent. Thus the electromagnet 153 is left unenergized but the changeover switches 154 and 155 are operated to separate the circuit of the electromagnet 153 from the power source E and to close the circuit of the exposure time control electromagnet 134 for the energization of the magnet 134. The shutter latch lever 125 initiates the shutter drive member 129 into movement, opening the count switch 132 to charge the capacitor C by way of the photocell 135. As a result the shutter drive member 129 is temporarily prevented from counterclockwise turning by the attraction member 133 while the capacitor C is being charged to keep the shutter fully opened. Upon the charged voltage of the capacitor C reaching the predetermined value, the switching circuit 136 deenergizes the electromagnet 134 and frees the shutter drive member 129 from engagement with the attraction member 133. The shutter drive member 129 therefore starts to turn in a counterclockwise direction again to close the shutter.

Briefly, if the brightness of the subject is lower than the specified level, the shutter described operates as an electronic program shutter wherein the shutter speed is controlled by the time of time constant of the light measuring intergration circuit to make a conrolled exposure ranging from a short-time exposure to a long-time exposure with the diaphragm aperture fully opened.

To cock the shutter, unillustrated shutter cocking means turns the shutter drive member 129 in a clockwise direction as in the case of FIG. 1. During this clockwise movement, a curved edge 129d along the rear side of the actuating arm 129c rides on the shutter opening pin 140a against the action of the coiled portion 131a of the spring 131 and then passes over the same in the manner already described, whereby the shutter is prevented from making an exposure again. The pin 129b drives the attraction member 133 counterclockwise, pressing its attraction piece 133b against the attracting face of the electromagnet 134 or bringing the same into proximity thereto. The pin 129a closes the count switch 132 and is engaged by the shutter latch lever 125, whereby the drive member 125 is latched in the cocked position.

When the shutter button 121 is relieved of the pressure upon the completion of photographing operation, the diaphragm operating lever 145 automatically returns counterclockwise under the action of the spring 147, causing its distal end 145a to push up the arm 148a of the diaphragm actuating member 148 in a clockwise direction, whereby the diaphragm aperture and the light receiving opening are closed to minimum sizes or totally, Thus the diaphragm mechanism has been returned to the original position by the removal of the depressing force from the shutter button before cocking the shutter. Further by virtue of the foregoing operation after the opening of the diaphragm aperture to the maximum size and switching of the changeover switches 154 and 155, the clockwise turning of the diaphragm actuating member 148 moves the movable contact members 154a, 155a out of contact with the stationary contact points 154c, 155c automatically into contact with the stationary contact points 154b and 155b.

According to the construction described, the main switch 124 is closed and the diaphragm operating lever 145 is turned clockwisse by the depression of the shutter botton 121 to control the diaphragm aperture size first, and the shutter latch lever 125 is then turned in a counterclockwise direction to initiate the counterclockwise movement of the shutter drive meember 129, the diaphragm operation and the shutter operation thus taking place in succession. Alternatively, the drive portion 145a of the diaphragm operating lever 145 and the driven portion 125a of the shutter latch lever 125 may be so arranged as to be depressible by the elastic seat plate 122 at the same time, such that the clockwise turning of the lever 145 and the counterclockwise turning of the lever 125 will be effected at the same time by the depression of the shuttter button 121, simultaneously with the closing of the main switch 124. This permits the shutter to start to open simultaneously with the diaphragm opening action. In this case, the respective members need be of such dimensions and be operable at such speed that the diaphragm aperture gives its maximum size just before or simultaneously when the shutter aperture opens to a full size. Further it is possible to incorporate the delaying means of FIG. 1 in such construction.

Although the foregoing embodiments are such that if the brightness of the subject is higher than the specified level, the maximum shutter speed is constant. This is based on the assumption that the two reciprocally slidable blades constituting the electronic shutter take a constant time for the reciprocal sliding movement. However, this invention is not limited particularly to the construction of this type, but it is also applicable to a high-speed shutter wherein the shutter speed (exposure time) is variable in accordance with the brightness of the subject. The photocell is not limited to a photoconductive cell but a photovoltaic cell, for example, may likewise be usable.

What is claimed is:

1. An electronic shutter comprising:
   a main switch,
   an exposure time control electric circuit to be closed by the main switch and including a light measuring integration circuit operable in accordance with the brightness of the subject to be photographed, an electromagnet to be energized for a period of time controlled by the electric circuit,
   a shutter drive member to be initiated into forward movement by depression of a shutter button and returnable by a shutter cocking operation, the drive member being operable to energize the light measuring integration circuit when initiated into movement,
   a shutter opening and closing member reciprocally movable by the forward movement of the drive member to reciprocally slidingly move a pair of shutter blades in opposite directions to each other and to thereby open and close the shutter,
   an attraction member to be held attracted at its cocked position by the electromagnet while the electromagnet is energized and freed from the attracting force upon deenergization of the electromagnet, the attraction member being engageable with the drive member to stop its forward movement temporarily at a position where the shutter is fully opened when held attracted at the cocked position, the attraction member permitting the drive member to forwardly move past the stopped position when freed from the holding force at the cocked position, and
   delaying means for delaying the operation of the drive member during a period after the initiation of movement of the drive member until the shutter starts to open.

2. The electronic shutter as set forth in claim 1 wherein the delaying means comprises a space provided by the shutter cocking operation between a portion of the drive member and a portion of the opening and closing member where the first engagement of the drive member with the opening and closing member taken place, the space being sufficient to delay the operation of the drive member during a period after the initiation of movement of the drive member until the engagement takes place.

3. The electronic shutter as set forth in claim 1 wherein the delaying means comprises a governor engageable with the drive member to brake its forward movement and to thereby delay its operation during the period after the initiation of movement of the drive member until the shutter starts to open.

4. The electronic shutter as set forth in claim 1 wherein the delaying means comprises the combination of a space provided by the shutter cocking operation between a portion of the drive member and a portion of the opening and closing member where the first engagement of the drive member with the opening and closing member takes place and a governor engageable with the drive member to delay the operation of the drive member when the drive member is initiated into movement.

5. The electronic shutter as set forth in claim 1 wherein the attraction member has an attraction piece to be pressed against the attracting face of the electromagnet by the shutter cocking operation, a latch arm positioned in the path of forward movement of the drive member while the attraction piece is in intimate contact with the attracting face of the electromagnet to latch the drive member and stop its forward movement temporarily at the position where the shutter is fully opened and a driven arm to be pushed by the drive member to press the attraction piece against the attracting face of the electromagnet at its cocked position when the drive member is returned by the shutter cocking operation, the driven arm permitting the movement of the drive member further to its overcocked position and being elastically deformable to elastically absorb the pressing force acting between the attraction piece and the attracting face, the attraction member being urged for movement to follow the forward movement of the drive member while the electromagnet is unenergized.

6. The electronic shutter as set forth in claim 5 wherein the attraction member has a driven portion to be selectively pushed for making a bulb exposure to hold the attraction piece pressed against the attracting face of the electromagnet while being subjected to the pushing pressure.

7. The electronic shutter as set forth in claim 1 further comprising:
an ammeter for detecting the variation of the resistivity of a photocell included in the light measuring integration circuit for detecting the brightness of the subject, and
a pair of diaphragm blades for forming a diaphragm aperture the size of which is determined by the angle of deflection of the pointer of the ammeter.

8. The electronic shutter as set forth in claim 7 wherein the pair of the diaphragm blades is operated directly by the pointer to determine the diaphragm aperture size.

9. The electronic shutter as set forth in claim 7 wherein the diaphragm blades are operated by a diaphragm actuating member to determine the diaphragm aperture size, the diaphragm actuating member being movable by a variable amount upon depression of the shutter button to detect the position of the pointer.

10. The electronic shutter as set forth in claim 1 further comprising:
another photcell having resistivity variable in accordance with the brightness of the subject of control a diaphragm aperture,
another electromagnet to be supplied with an energizing current controlled by the photocell to give a variable magnetic force,
a diaphragm actuating member movable by following the forward movement of the shutter drive member,
a pair of diaphragm blades connected to the diaphragm actuating member and slidingly movable in directions opposite to each other to increase the size of the diaphragm aperture, and
a rotary member for transmitting to the diaphragm actuating member a braking force in accordance with the magnitude of the magnetic force of the electromagnet to control the speed of increase in the diaphragm aperture size by the diaphragm blades.

11. The electronic shutter as set forth in claim 10 wherein the rotary member is a rotary disc made of an electroconductor having part of its periphery interposed between the magnetic poles of the electromagnet and the rotation of the rotary disc is braked by an eddy current produced between the disc and the electromagnet.

12. The electronic shutter as set forth in claim 10 wherein the rotary member is a rotary disc made of a magnetically sensitive material and toothed along its outer periphery to provide indentations and projections, the rotary disc being rotatably interposed between the magnetic poles of the electromagnet and the rotation of the rotary disc is braked by an electromagnetic attracting force acting on the projections.

13. The electronic shutter as set forth in claim 1 further comprising:
a pair of diaphragm blades having diaphragm openings and light receiving openings, the pair of diaphragm blades being slidable in directions opposite to each other to increasingly overlap the respective openings to increase the sizes of the resulting apertures,
a diaphragm actuating member to be initiated into movement by depression of the shutter button to bring the diaphragm blades into sliding movement, a diaphragm control electric circuit including a comparison circuit comprising a photocell having resistivity variable by detecting the brightness of the subject through the light receiving openings and a fixed resistor connected in series with the photocell, and
an electromagnet to be energized with timing controlled by the diaphragm control electric circuit, the electromagnet being adapted to be energized by the resistivity of the photocell coming into balance with the resistivity of the fixed resistor to attract and stop the diaphragm blades sliding in opposite directions to each other and to thereby determine the size of the diaphragm aperture.

14. The electronic shutter as claimed in claim 13 wherein the diaphragm control electric circuit shares the photocell with the exposure time control electric circuit by way of two changeover switches having movable contact members operable by the diaphragm actuating member when the diaphragm aperture has been opened to its maximum size so as to disconnect the photocell from the diaphragm control electric circuit and to incorporate the same into the exposure time control electric circuit.

15. An electronic shutter comprising:

An exposure time control electric circuit having a main switch to be closed by depression of a shutter button and including a light measuring integration circuit operable in accordance with the brightness of the subject to be photographed, an electromagnet to be energized for a period of time controlled by the electric circuit, a shutter drive member to be initiated into forward movement by depression of the shutter button and returnable by a shutter cocking operation, the drive member being operable to energize the light measuring integration circuit when initiated into movement, a shutter opening and closing member reciprocally movable by the forward movement of the drive member to reciprocally slidingly move a pair of shutter blades in opposite directions to each other and to thereby open and close the shutter, an attraction member to be held attracted at its cocked position by the electromagnet while the electromagnet is energized and freed from the attracting force upon deenergization of the electromagnet, the attraction member being engageable with the drive member to stop its forward movement temporarily at a position where the shutter is fully opened when held attracted at the cocked position, the attraction member permitting the drive member to forwardly move past the stopped position when freed from the holding force at the cocked position, a pair of diaphragm blades having diaphragm openings and light receiving openings, the pair of diaphragm blades being slidable in directions opposite to each other to increasingly overlap the respective openings to increase the sizes of the resulting apertures, a diaphragm actuating member to be initiated into movement by depression of the shutter button before the initiation of movement of the drive member to bring the diaphragm blades into sliding movement, a diaphragm control electric circuit including a comparison circuit comprising a photocell having resistivity variable by detecting the brightness of the subject through the light receiving openings and a fixed resistor connected in series with the photocell, the diaphragm control electric circuit being operable before the energization of the exposure time control electric circuit, and an electromagnet to be energized with timing controlled by the diaphragm control electric circuit, the electromagnet being adapted to be energized by the resistivity of the photocell coming into balance with the resistivity of the fixed resistor to attract and stop the diaphragm blades sliding in opposite directions to each other and to thereby determine the size of the diaphragm aperture.

16. The electronic shutter as claimed in claim 15 wherein the diaphragm control electric circuit shares the photocell with the exposure time control electric circuit by way of two changeover switches having movable contact members operable by the diaphragm actuating member when the diaphragm aperture has been opened to its maximum size so as to disconnect the photocell from the diaphragm control electric circuit and to incorporate the same into the exposure time control electric circuit.

* * * * *